United States Patent [19]

Roeker

[11] Patent Number: 4,569,431
[45] Date of Patent: Feb. 11, 1986

[54] DUAL HAND CONTROL

[75] Inventor: David C. Roeker, Hudson, Wis.

[73] Assignee: Terryl K. Qualey, St. Paul, Minn.; a part interest

[21] Appl. No.: 611,313

[22] Filed: May 17, 1984

[51] Int. Cl.⁴ .................................................. F16P 3/18
[52] U.S. Cl. .................................. 192/131 R; 251/263
[58] Field of Search ............... 192/129 R, 130, 131 R; 251/257, 262, 263; 91/424; 200/61.58 R, 50 R, 5 B; 74/99 A, 110

[56] References Cited

U.S. PATENT DOCUMENTS

| | | | |
|---|---|---|---|
| 2,046,531 | 7/1936 | Page | 192/131 R |
| 3,563,356 | 2/1971 | Glickman | 192/131 R |
| 3,605,969 | 9/1969 | Cornu et al. | 192/131 R |
| 4,252,228 | 2/1981 | White | 192/131 R |

Primary Examiner—Samuel Scott
Assistant Examiner—H. A. Odar
Attorney, Agent, or Firm—Terryl K. Qualey

[57] ABSTRACT

A dual hand control actuation mechanism for a manually actuated device has a pair of opposed actuating rods that have wedge shaped ends defining forward and rearward camming surfaces to interact with forward and rearward cam surfaces on a cam member positioned between the actuating rods. If both of the actuating rods are pushed simultaneously, their forward cam surfaces engage the rearward cam surfaces of the cam member and move the cam member to cause it to engage a switch to actuate the device. If one of the actuating rods is pushed before the other, its forward camming surface engages the rearward camming surface on the cam member and pivots the cam member preventing the other actuating member from engaging the cam member in a manner that will move the cam member against the switch, thereby preventing actuation of the device.

2 Claims, 4 Drawing Figures

DUAL HAND CONTROL

FIELD OF THE INVENTION

The present invention relates to a dual hand control actuation mechanism for a manually actuated device to positively prevent the device from being actuated unless both hand controls are actuated simultaneously.

BACKGROUND OF THE INVENTION

Punch presses, brakes, bending machines and other heavy machinery pose a great danger to the operator unless actuation of the device requires that both hands of the operator be withdrawn from the machinery before it can be actuated. Early mechanisms provided two spaced actuator buttons to occupy both hands of the operator away from the operating parts of the device while it was in operation. However, many of those prior art devices could be defeated by tying one button down, thus enabling the operator to actuate the machine with one hand. Two handed devices requiring simultaneous actuation to prevent the operator from tying down one of the buttons are disclosed in U.S. Pat. Nos. 2,046,531; 2,962,633; 3,491,867; 3,563,356; and 4,085,626. However, each of these mechanisms is in some respect unduly complex.

SUMMARY OF THE INVENTION

The present invention provides a dual hand control actuation mechanism for a manually actuated device. It has a pair of opposed push buttons at the remote ends of spaced opposed actuating rods that are axially movable towards each other from a normal rest position to an actuation position upon depression of the push buttons, and a resilient member that urges the push buttons and actuating rods toward their rest positions. The opposed ends of the actuating rods are inclined to their axes to define forward camming surfaces. A cam member is positioned between the actuating rods and it has a pair of rearward camming surfaces, one oppositely inclined and positioned spaced from and in opposition to the forward camming surface of each of the actuating rods in the normal rest position of the cam member and the actuating rods. The cam member is formed with a guide aperture slot having a major axis that is perpendicular to the axes of the actuating rods in the normal rest position of the cam member, and a stationary guide pin extends into the guide aperture in the cam member. A resilient member applies a resilient force to the cam member in alignment with the major axis of the guide slot when the cam member is in its normal rest position and urges the cam member to its normal rest position with the end of the guide slot farthest from the rearward cam surfaces contacting the guide pin. A switch is spaced from the cam member in its rest position. When the push buttons are simultaneously pushed to their actuation position, the forward camming surfaces of the actuating rods simultaneously engage and slide along the rearward cam surfaces of the cam member advancing the cam member until it contacts the switch and actuates the device. If the push buttons are not pushed simultaneously, the actuating rod on the one pushed first pivots the cam member on the guide pin. This prevents the forward camming surface of the other actuating rod from engaging the rearward cam surface on the cam member and thus prevents actuation of the device.

THE DRAWING

DESCRIPTION OF THE PREFERRED EMBODIMENT

The dual hand control actuation mechanism of the present invention is illustrated in a press 9 which has an upper working surface 10 against which an air actuated ram forces a platen 11 upon actuation of an air switch 12. The illustrated press 9 is designed to press the parts of multiple contact electrical connectors together simultaneously as electrical connection is made between contacts in the connector and the conductors of a multiple conductor flat electrical cable.

Figure 1:
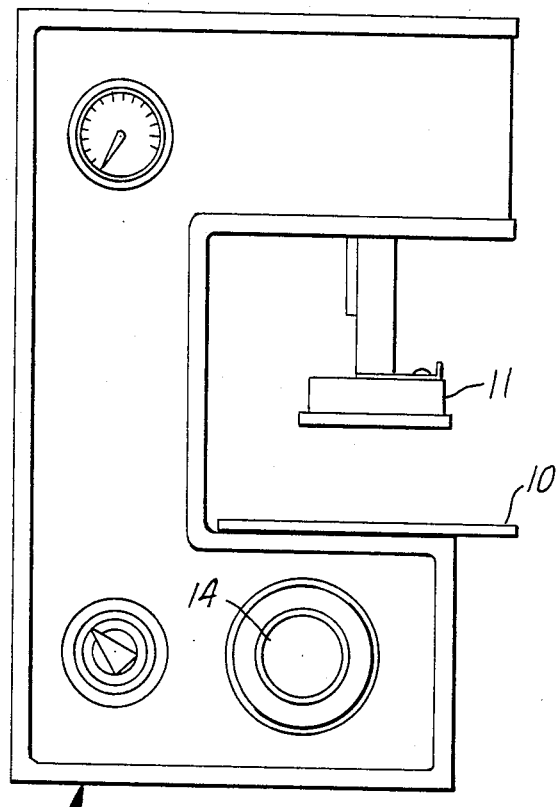
FIG. 1 is a side elevation view of a press in which the dual hand control actuation mechanism of the present invention is used.
Figure 2:
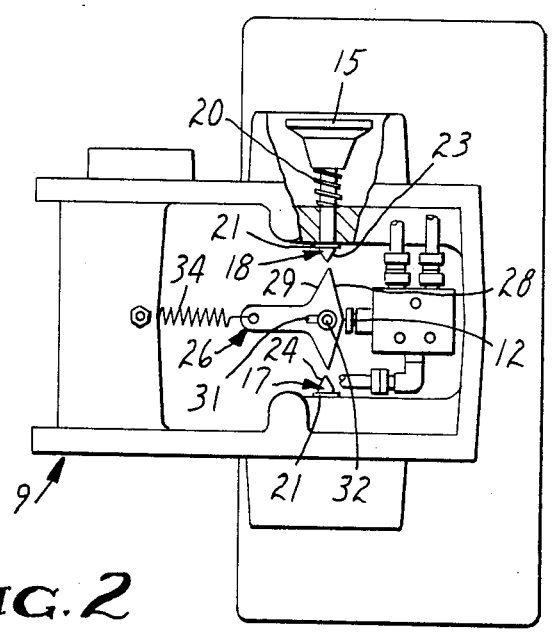
FIG. 2 is a bottom view of the press of FIG. 1 with parts broken away to show the dual hand control actuation mechanism constructed in accordance with the present invention with the parts thereof in their normal rest positions.

The dual hand control actuation mechanism includes a pair of push buttons 14 and 15 at the remote ends of space opposed actuating rods 17 and 18, respectively. The actuating rods 17 and 18 are cylindrical, they extend through apertures in the vertical walls of the base casting of the press 9 and they are axially movable toward each other from a normal rest position, illustrated in FIG. 2, to an actuation position, illustrated in FIG. 3, upon simultaneous depression of the push buttons 14 and 15. A compression spring 20 is on each of the actuating rods 17 and 18 and they are captured between the outer walls of the press housing and the push buttons 14 and 15 to urge the actuating rods and push buttons outwardly. A retaining ring 21 on each of the actuating rods 17 and 18 near their opposed ends has a larger diameter than the aperture through the housing wall and limits the outward movement of the actuating rod. The opposed ends of the actuating rods are conical, thereby in two dimensions always presenting wedge shaped appearing ends that define a forward camming surface 23 and a rearward camming surface 24 inclined to the axes of the actuating rods.

A cam member 26 is positioned between the actuating rods. The cam member has a pair of camming wedges extending outward from opposed sides thereof in opposition to the wedge shaped ends of the actuating rods 17 and 18, each camming wedge having a forward cam surface 28 and a rearward cam surface 29. In its normal rest position, the cam member 26 is positioned so that the rearward cam surface 29 of each of its camming wedges is spaced from and in opposition to the oppositely inclined forward camming surface 23 of the corresponding actuating rod 17 or 18. The normal rest position of the cam member 26 is defined by the coaction of a guide aperture slot 31 through the cam member 26, a stationary guide pin 32 extending into and through the guide aperture slot in the cam member and a tension spring 34. In the normal rest position of the cam member 26, illustrated in FIG. 2, the major axis of the guide aperture slot 31 is perpendicular to the axes of the actuating rods 17 and 18. The tension spring 34 is connected between the end of the cam member 26 and the frame of the press 9 to apply a resilient force to the cam member 26 in alignment with the major axis of the guide aperture slot 31 when the cam member is in its normal rest position, and it urges the cam member 26 to its normal rest position with the end of the guide aperture slot farthest from the rearward cam surfaces 29 contacting the guide pin 32 when no other forces are applied to the cam member 26.

The air switch 12 is spaced from the end of the cam member toward which the forward cam surfaces 28 converge and it is positioned to be actuated by the end of the cam member 26 when the push buttons 14 and 15 are simultaneously pushed.

Figure 3:
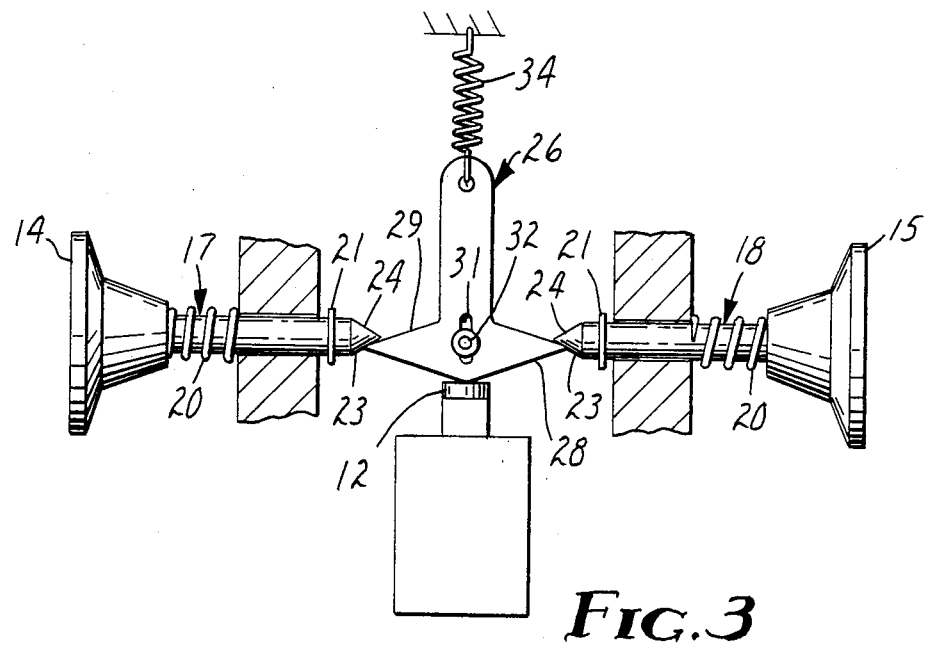
FIG. 3 is a view similar to that of FIG. 2 showing only the dual hand control actuation mechanism with the parts thereof moved to the actuation position.

In use, if the push buttons 14 and 15 are depressed simultaneously to their actuation position, the forward camming surfaces 23 of the actuating rods 17 and 18 simultaneously engage and slide along the rearward cam surfaces 29 of the cam member 26. This advances the cam member until it contacts and depresses the switch button on the air switch 12, as illustrated in FIG. 3, to actuate the press. Release of the push buttons 14 and 15 permits the compression springs 20 to return the push buttons 14 and 15 and actuating rods 17 and 18 to their rest positions. This permits the tension spring 34 to return the cam member 26 to its rest position. This also permits the air switch button to return to its rest position causing the air pressure to be switched to return the ram and platen 11 to their retracted rest position.

Figure 4:
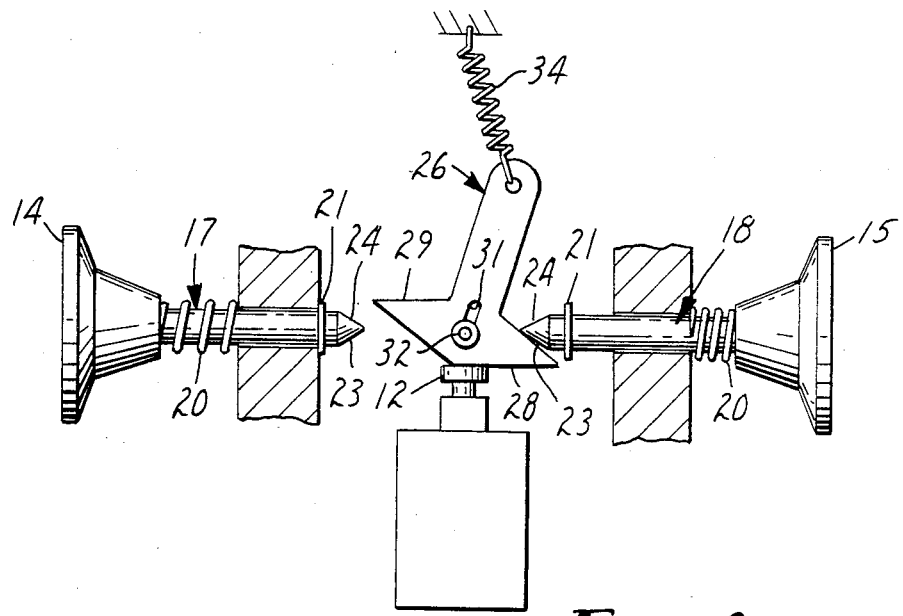
FIG. 4 is a view similar to those of FIGS. 2 and 3 illustrating the operation when the push buttons are not pressed simultaneously.

If one of the push buttons 15 is depressed prior to the depression of the other push button 14, as illustrated in FIG. 4, the forward camming surface 23 on the actuating rod 18 engages the rearward cam surface 29 on the cam member 26 and pivots the cam member on the guide pin 32 but does not advance it toward the air switch 12. Once the cam member 26 is pivoted, if the other push button 14 is depressed, the rearward cam surface 24 on the actuating rod 17 engages the forward cam surface 28 on the cam member 26 and simply causes further pivoting of the cam member without advancing it toward the switch 12. Thus, the switch cannot be operated if one of the push buttons is tied down, and each actuation of the mechanism requires both push buttons 14 and 15 to be depressed simultaneously.

I claim:

1. A dual hand control actuation mechanism for a manually actuated device comprising:

a pair of push buttons at the remote ends of spaced opposed actuating rods that are axially movable toward each other from a normal rest position to an actuation position upon depression of said push buttons, the opposed ends of said actuating rods being inclined to their axes to define forward camming surfaces, resilient means urging said push buttons and actuating rods toward their rest positions, a cam member positioned between said actuating rods, said cam member having a pair of rearward cam surfaces, one oppositely inclined and positioned spaced from and in opposition to each of said inclined ends of said actuating rods in the normal rest positions of said cam member and said actuating rods, said cam member being formed with a guide aperture slot having a major axis that is perpendicular to the axes of said actuating rods in the normal rest position of said cam member, a stationary guide pin extending into said guide aperture slot in said cam member, means for applying a resilient force to said cam member in alignment with the major axis of said guide aperture slot when said cam member is in its normal rest position and urging said cam member to its normal rest position with the end of said guide aperture slot farthest from said rearward cam surfaces contacting said guide pin, and a switch spaced from said cam member and positioned to be actuated by said cam member only when said push buttons are simultaneously pushed to move said actuating rods axially toward each other to their said actuation position causing said forward camming surfaces of said actuating rods simultaneously to engage and slide along said rearward cam surfaces of said cam member and advance said cam member to an actuation position.

2. The dual hand control actuation mechanism of claim 1 wherein said actuating rods are wedged shaped at their opposing ends to define forward and rearward camming surfaces and said cam member has a pair of camming wedges extending outward from opposite sides thereof in opposition to said wedge shaped ends of said actuating rods, each camming wedge having a rearward and a forward cam surface, whereby when one of said push buttons is pushed first the forward camming surface of its actuating rod engages the rearward camming surface of said cam member and pivots said cam member on said guide pin and later pushing of the second push button causes the rearward camming surface of its actuating rod to engage the forward camming surface of said cam member to further accentuate the pivoting of said cam member and prevent advancement of said cam member to its said actuation position, thereby to prevent actuation of said switch.

* * * * *